US011282055B2

(12) United States Patent
Braga

(10) Patent No.: US 11,282,055 B2
(45) Date of Patent: Mar. 22, 2022

(54) METHOD AND APPARATUS FOR CUSTOMER NOTIFICATION SYSTEM

(71) Applicant: Moneygram International, Inc., Minneapolis, MN (US)

(72) Inventor: Joseph R. Braga, Minneapolis, MN (US)

(73) Assignee: MoneyGram International, Inc., Minneapolis, MN (US)

(*) Notice: Subject to any disclaimer, the term of this patent is extended or adjusted under 35 U.S.C. 154(b) by 94 days.

(21) Appl. No.: 15/841,594

(22) Filed: Dec. 14, 2017

(65) Prior Publication Data

US 2019/0188668 A1 Jun. 20, 2019

(51) Int. Cl.
| | | |
|---|---|---|
| G06Q 20/02 | (2012.01) | |
| G06Q 20/18 | (2012.01) | |
| H04W 4/02 | (2018.01) | |
| G08B 5/22 | (2006.01) | |
| G06Q 20/14 | (2012.01) | |
| G06Q 20/32 | (2012.01) | |
| G06Q 20/10 | (2012.01) | |
| G07F 17/40 | (2006.01) | |
| G06Q 30/02 | (2012.01) | |

(52) U.S. Cl.
CPC ............ G06Q 20/18 (2013.01); G06Q 20/02 (2013.01); G06Q 20/102 (2013.01); G06Q 20/14 (2013.01); G06Q 20/3224 (2013.01); G06Q 30/0241 (2013.01); G07F 17/40 (2013.01); G08B 5/223 (2013.01); H04W 4/023 (2013.01)

(58) Field of Classification Search
CPC ........ G06Q 20/18; G06Q 20/02; G06Q 20/14; G08B 5/223
USPC .......................................................... 704/30
See application file for complete search history.

(56) References Cited

U.S. PATENT DOCUMENTS

| | | | | |
|---|---|---|---|---|
| 8,407,121 | B2* | 3/2013 | Paintin | G06Q 20/3224 |
| | | | | 705/35 |
| 9,754,295 | B2* | 9/2017 | Hanson | H04W 4/02 |
| 9,785,936 | B1* | 10/2017 | Baird | G06Q 20/3276 |
| 2010/0042537 | A1* | 2/2010 | Smith | G06Q 40/02 |
| | | | | 705/40 |
| 2013/0066778 | A1* | 3/2013 | Davis | G06Q 20/40 |
| | | | | 705/44 |
| 2014/0100925 | A1* | 4/2014 | Popescu | G06Q 10/06 |
| | | | | 705/14.4 |

(Continued)

*Primary Examiner* — Narayanswamy Subramanian
*Assistant Examiner* — Paul S Schwarzenberg

(57) ABSTRACT

A method for beacon device-based customer notifications is provided. The method is implemented by a computing device including a processor. The method includes receiving, from a beacon device, a beacon device advertisement that includes a universally unique identifier (UUID), a major identifier, and a minor identifier. The method also includes identifying, based on at least one of the UUID, the major identifier, and the minor identifier, that the beacon device is associated with an agent location, where the agent location is corresponds to a bill payment and money transfer facility. The method further includes generating a payment notification for display on the computing device, where the payment notification includes payment data and agent location data, receiving, from a user, an instruction to prepare to make a payment at the agent location, and causing the agent location to stage the payment for completion by the user.

19 Claims, 7 Drawing Sheets

(56) References Cited

U.S. PATENT DOCUMENTS

2016/0014552 A1\* 1/2016 Hanson .............. G06Q 20/3224
455/456.3
2017/0127233 A1\* 5/2017 Liang ...................... H04L 67/22
2017/0206572 A1\* 7/2017 Hanson ................... H04W 4/02

\* cited by examiner

METHOD AND APPARATUS FOR CUSTOMER NOTIFICATION SYSTEM

BACKGROUND

Modern computer technology has brought several improvements to the bill payment and money transfer industry. Computer applications and devices such as smartphones have enabled consumers to make paperless bill payments and money transfers, for example. Consumer computing devices (e.g., mobile phones, laptops, or desktops) also often have calendar or scheduling applications that can send notifications to consumers regarding, for example, payment due dates and recurring payment dates. Such notifications may be received from an application locally stored on the consumer computing device, or from a remote source. Often, when a notification is received, a challenge is being near a bill payment and money transfer agent location to quickly make an in-person payment. Relatedly, a person may be located or traveling through the vicinity of an agent location but be unaware of this. For example, certain agent locations are affiliated with other businesses such that it may not be obvious from the outside that a business supports bill payment and money transfer functions or that the business hosts a bill payment and money transfer agent. In such situations, there may be a payment due, the desire to make a payment, and also the opportunity to make a payment, but the person lacks the knowledge of this opportunity.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

BRIEF SUMMARY

Figure 1:
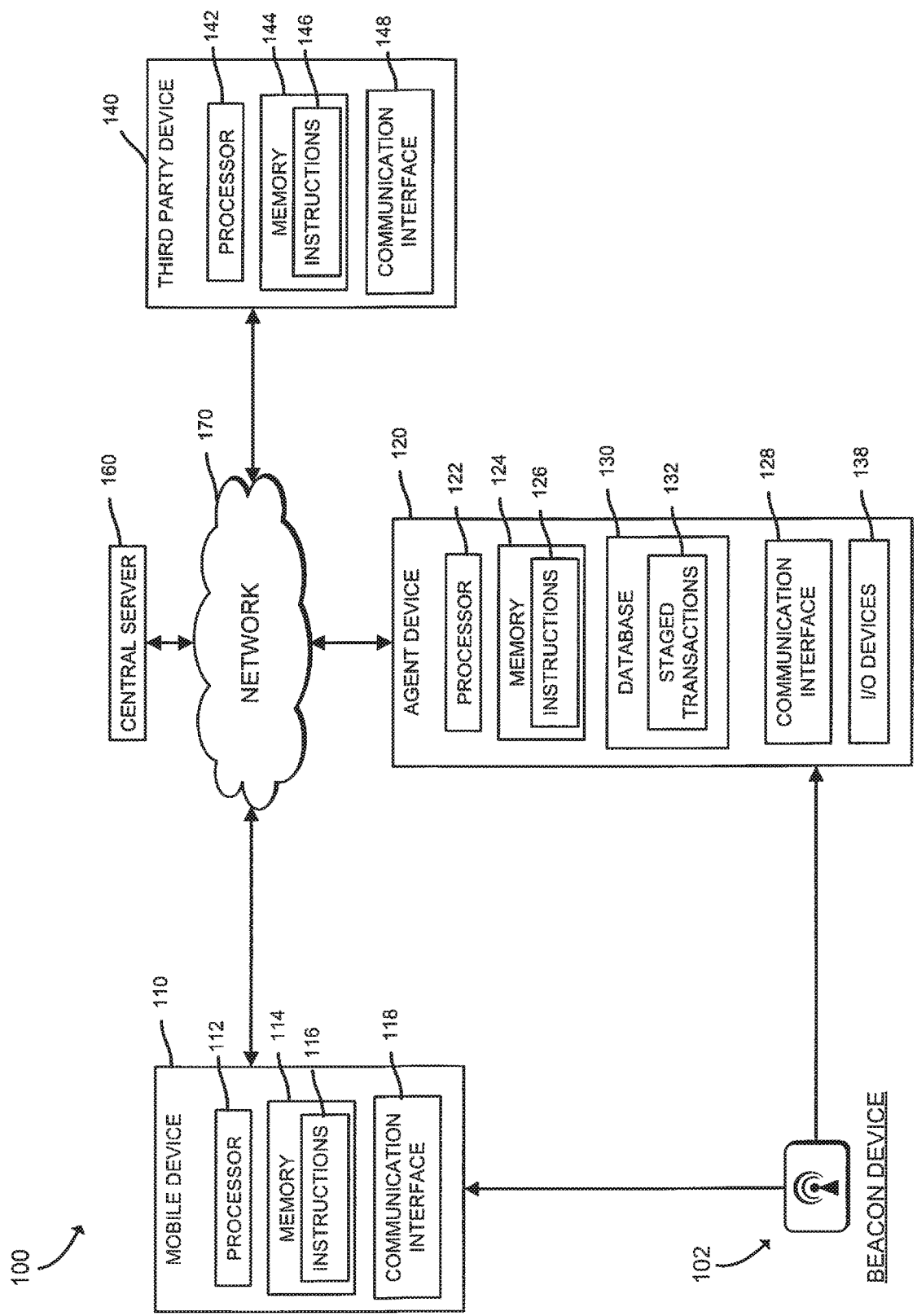
FIG. 1 is a block diagram of an exemplary system for customer notifications using a beacon device that may be implemented according to various embodiments.

The present disclosure provides for systems, methods, and computer-readable storage devices configured to perform customer notifications using electronic beacon devices that are installed at agent locations. Information associated with a beacon advertisement may enable a mobile device in the vicinity of the beacon device to detect the presence of the beacon, as well as other information including, for example, a distance to the agent location that hosts the beacon. When a beacon advertisement is received, a computer application or software program on the mobile device may generate an alert message for the consumer operating the mobile device that an agent location is near and/or that a payment is due that can be completed at the agent location that transmitted the beacon advertisement. The exemplary systems, methods, and computer-readable storage devices described herein may increase the convenience of bill payment and money transfers for consumers, and may decrease the incidence of late payments. Additionally, the exemplary systems, methods, and computer-readable storage devices described herein may improve the function of a computer application in that an existing bill payment and money transfer application operating on the consumer's mobile device has its functionality extended to be able to process beacon advertisements and generate consumer alerts.

In accordance with an exemplary aspect, a method includes receiving from a beacon device, by the processor, a beacon device advertisement, wherein the beacon device advertisement includes a universally unique identifier (UUID), a major identifier, and a minor identifier, identifying, based on at least one of the UUID, the major identifier, and the minor identifier, that the beacon device is associated with an agent location, wherein the agent location is corresponds to a bill payment and money transfer facility, generating a payment notification for display on the computing device, wherein the payment notification includes payment data and agent location data, receiving, from a user, an instruction to prepare to make a payment at the agent location, and causing the agent location to stage the payment for completion by the user.

In accordance with another exemplary aspect, a computing device includes receiving from a beacon device, by the processor, a beacon device advertisement, wherein the beacon device advertisement includes a universally unique identifier (UUID), a major identifier, and a minor identifier, identifying, based on at least one of the UUID, the major identifier, and the minor identifier, that the beacon device is associated with an agent location, wherein the agent location is corresponds to a bill payment and money transfer facility, generating a payment notification for display on the computing device, wherein the payment notification includes payment data and agent location data, receiving, from a user, an instruction to prepare to make a payment at the agent location, and causing the agent location to stage the payment for completion by the user.

In accordance with yet another exemplary aspect, a computer-readable storage device stores instructions that, when executed by a processor, cause the processor to perform operations that include receiving from a beacon device, by the processor, a beacon device advertisement, wherein the beacon device advertisement includes a universally unique identifier (UUID), a major identifier, and a minor identifier, identifying, based on at least one of the UUID, the major identifier, and the minor identifier, that the beacon device is associated with an agent location, wherein the agent location is corresponds to a bill payment and money transfer facility, generating a payment notification for display on the computing device, wherein the payment notification includes payment data and agent location data, receiving, from a user, an instruction to prepare to make a payment at the agent location, and causing the agent location to stage the payment for completion by the user.

The foregoing has outlined rather broadly the features and technical advantages of the present invention in order that the detailed description that follows may be better understood. Additional features and advantages will be described hereinafter which form the subject of the embodiments in one or more aspects. It should be appreciated by those skilled in the art that the conception and specific embodiments disclosed may be readily utilized as a basis for modifying or designing other structures for carrying out the same purposes of the present application. It should also be realized by those skilled in the art that such equivalent constructions do not depart from the spirit and scope of the application as set forth herein. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring to FIG. 1, a block diagram of an exemplary system for customer notifications using a beacon device is shown as a system 100. In FIG. 1, a beacon device 102, a mobile device 110, an agent device 120, a third party device 140, a central server 160, and a network(s) 170 are shown. The system 100 may facilitate customer notifications using beacon device 102 for a consumer (e.g., a consumer of the mobile device 110) in connection with a transaction between the consumer and a third party, as described in more detail below.

The mobile device 110 includes a processor 112, a memory 114, and a communication interface 118. The memory 114 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 114 may store instructions 116 that, when executed by the processor 112, cause the processor 112 to perform operations described in connection with the mobile device 110 with reference to FIGS. 1-4.

The communication interface 118 may be configured to communicatively couple the mobile device 110 to one or more networks, such as a network 170, as shown in FIG. 1. The communication interface 118 may be configured to communicatively couple the mobile device 110 to the network 170 via a wired or wireless connection established according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a $3^{rd}$ generation (3G) protocol, a $4^{th}$ generation (4G)/long term evolution (LTE) protocol, etc.).

The network 170 may be a wired network, a wireless network, or may include a combination of wired and wireless networks. For example, the network 170 may be a local area network (LAN), a wide area network (WAN), a wireless WAN, a wireless LAN (WLAN), a metropolitan area network (MAN), a wireless MAN network, a cellular data network, a cellular voice network, the internet, etc. Additionally, the network 170 may include multiple networks operated by different entities. For example, the network 170 may include a first network (e.g., a payment processing network) operated by a first network operator (e.g., a financial card payment processing entity, a credit card company, a bank, an automatic clearing house (ACH) entity, another type of financial entity, etc.) and a second network (e.g., a LAN, WAN, WLAN, wireless WAN, etc.) operated by a second operator (e.g., a money transfer agent, an operator of a chain of grocery stores, a fueling station, an operator of a chain of fueling stations, etc.). The mobile device 110 may communicate with the agent device 120 and/or the third party device 140 via the connection to the network 170. As shown in FIG. 1, the agent device 120 includes a processor 122, a memory 124, and a communication interface 128. The memory 124 may include read-only memory (ROM) devices, random-access memory (RAM) devices, one or more hard disk drives (HDDs), flash memory devices, solid-state drives (SSDs), other devices configured to store data in a persistent or non-persistent state, or a combination of different memory devices. The memory 124 may store instructions 126 that, when executed by the processor 122, cause the processor 122 to perform operations described in connection with the agent device 120 with reference to FIGS. 1-4. The communication interface 128 may be configured to communicatively couple the agent device 120 to one or more networks, such as the network 170, as shown in FIG. 1. The communication interface 128 may be configured to communicatively couple the agent device 120 to the network 170 via a wired or wireless connection established according to one or more communication protocols or standards (e.g., an Ethernet protocol, a TCP/IP protocol, IEEE 802.11 protocol, and an IEEE 802.16 protocol, a 3G protocol, a 4G/LTE protocol, etc.).

In an aspect, the agent device 120 may be a laptop computing device, a personal computing device, a tablet computing device, a point of sale (POS), a handheld POS, a smartphone, a mobile communication device, electronic kiosk, or any other electronic device operable to perform the operations of the agent device 120, as described with reference to FIGS. 1-4. The agent device 120 may include or may be coupled to one or more input/output (I/O) devices 138. The I/O devices 138 may include a money order printer, a signature pad, a camera, a pin pad module, a financial card reader, a biometric scanner, a receipt printer, another printing device, a barcode scanner, a metering device, a weight sensor, a check reader, a mouse, a keyboard, a touchscreen display device, a printer, a card scanner, a numeric keypad, a check reader, other types of input and output devices, or a combination thereof.

As shown in FIG. 1, the third party device 140 includes a processor 142, a memory 144, and a communication interface 148. The memory 144 may include ROM devices, RAM devices, one or more HDDs, flash memory devices, SSDs, other devices configured to store data in a persistent or non-persistent state, or a combination of different memory devices. The memory 144 may store instructions 146 that, when executed by the processor 142, cause the processor 142 to perform operations described in connection with the third party device 140 with reference to FIGS. 1-4. The communication interface 148 may be configured to communicatively couple the third party device 140 to one or more networks, such as the network 170, as shown in FIG. 1. The communication interface 148 may be configured to communicatively couple the third party device 140 to the network 170 via a wired or wireless connection established according to one or more communication protocols or standards (e.g., an Ethernet protocol, a TCP/IP protocol, IEEE 802.11 protocol, and an IEEE 802.16 protocol, a 3G protocol, a 4G/LTE protocol, etc.).

In an aspect, the third party device 140 may be a utility company that periodically bills the consumer. In another aspect, the third party device 140 may be similar to mobile device 110 in that the third party device 140 is operated by another consumer that, for example, is to be the recipient of a recurring payment. In yet another aspect, the third party device 140 may be a web server providing an online shopping website or service, a laptop computing device, a personal computing device, a tablet computing device, a POS, a handheld POS, a smartphone, a mobile communication device, or any other electronic device operable to perform the operations of the third party device 140, as described herein with reference to FIGS. 1-4. In an aspect, an online retailer may operate the third party device 140 to facilitate customer notifications using a beacon device, such as the consumer, that make purchases from the online retailer.

The third party device 140 may include or may be coupled to one or more peripheral devices (not shown in FIG. 1). For example, the one or more peripheral devices may include a money order printer, an identification capture device (e.g., a signature pad, a camera, a pin pad module, a financial card reader, a biometric scanner, etc.), a receipt printer, another printing device, a barcode scanner, a metering device, a weight sensor, a check reader, etc. The third party device 140 may process financial transactions (e.g., deposits to and withdrawals from accounts at a bank entity, wire transfers, account-to-account transfers between different accounts within the banking entity, account-to account transfers between an account of the banking entity and an account of another entity, processing of payments using gift cards, debit cards, and/or credit cards, etc.), or may be coupled to a peripheral device or network that processes and/or executes the banking and financial card transactions.

The agent device 120 may be one of many agent devices 120 located at a money transfer location operated by a money transfer entity that provides money transfer services between a sending party and a receiving party. The money transfer location may be a brick-and-mortar location, or may be located within a brick-and-mortar location of another entity, such as within a grocery store. In addition to providing money transfer services, the money transfer entity (e.g., an operator of the agent device 120) may provide beacon advertisements on behalf of one or more third parties (e.g., an operator of the third party device 140). The money transfer entity may charge the third party, the operator of the third party device 140 (which may be the third party), the consumer, and/or another entity a fee for providing the beacon advertisement services in connection with the transaction.

The beacon device 102 may be any electronic device that is configured to broadcast (or receive) data messages within predefined distances. In the illustrative embodiment, the beacon device 102 broadcasts a data message (also referred to herein as an advertisement) that includes at least one of a universally unique identifier (UUID), a major identifier, and a minor identifier. At a predefined interval (e.g., every 100 milliseconds), the beacon device 102 transmits an advertisement including the UUID, major identifier, and or minor identifier. These three identifiers may be preset or customizable. In the illustrative embodiment, the UUID contains 32 hexadecimal digits, split into 5 groups, separated by hyphens. The major identifier and minor identifier are unsigned integer values between 0 and 65535. For example, the UUID may be a string of letters and numbers such as "6a01b284-e906-4180-ad3e-*a*002cb10febc". In the illustrative embodiment, the UUID uniquely identifies the beacon device 102. The major identifier identifies and distinguishes a group of units. For example, the major identifier may identify a particular type of agent location, or a particular group of agent locations as identified by geography (e.g., a city or neighborhood). Similarly, the minor identifier can identify a beacon device 102 at a more granular level (e.g., the beacon device 102 on the upstairs level of a store). In another embodiment, the major identifier and/or minor identifier may be set to a specific value that a computer application (e.g., the computer application 225 described below with respect to FIG. 2) running on the mobile device 110 will interpret in a specific way. For example, the major and/or minor identifier may be used as a flag (e.g., set to "1" to denote "Yes" or "0" to denote "No") to indicate, for example, whether the agent location 204 accepts certain types of payments.

In the illustrative embodiment, the beacon device 102 transmits the advertisement within a defined physical space (e.g., a circular two-dimensional space around the beacon device 102 defined by a radius of 100 meters). In the illustrative embodiment, any device (e.g., the mobile device 110) that physically enters the defined physical space will receive the beacon advertisement. The beacon device 102 may or may not be aware of the mobile device 110.

In the illustrative embodiment, the mobile device 110 operates a computer application that is configured to receive and process beacon advertisements. The computer application may be embodied in the instructions 116, and is configured to perform several other functions. In one embodiment, the computer application may be a bill payment and money transfer application. The computer application will then be configured to manage account data, present notifications, receive consumer instructions (e.g., regarding payments) or the like. As an example, the computer application may be the MoneyGram® application offered by MoneyGram International Inc. (MONEYGRAM is a registered trademark of Moneygram International Inc., headquartered in Dallas, USA).

In one embodiment, such an application is distributed to or downloaded at the mobile device 110 to facilitate bill payment and money transfer functionalities with other users that have access to network 170. Such an application may include an Android™ or iPhone™ application configured to execute on a mobile device (ANDROID is a registered trademark of Google Inc., headquartered in Mountain View, USA; IPHONE is a registered trademark of Apple Inc., headquartered in Cupertino, USA). In these embodiments, mobile device information may be utilized as part of a user's profile or account, e.g. the type of device, the location of the device, etc. Such information may be utilized in initiating and completing a money transfer transaction. In addition, such applications may facilitate geolocation capabilities in order to locate the mobile device 110 within a beacon notification zone (as described below with respect to FIG. 2) Such data may be retrieved using UPS data from mobile device 110.

The system 100 facilitates beacon advertisements associated with the consumer in connection with a transaction (e.g., a consumer-to-business transaction or a consumer to consumer transaction) between the consumer and a third party. To illustrate, the third party may be an online retailer, and the consumer may initiate the transaction with the third party by initiating a purchase from a website provided by the third party. In an aspect, the third party device 140 may function as, or may be communicatively coupled to a web server that provides the website. In an additional or alternative aspect, the third party device 140 may be distinct from the web server that provides the website, and may communicate with the web server to facilitate beacon advertisements for upcoming or recurring payments associated with the consumer on behalf of the third party (e.g., the online retailer).

In response to initiating the transaction, the third party device 140 may generate transaction information. The transaction information may include information descriptive of a transaction initiated between the consumer and the third party. For example, the transaction information may include a transaction identifier. In an aspect, the transaction identifier may be a code (e.g., a numeric code, an alphanumeric code, etc.). In an additional or alternative aspect, the transaction identifier may correspond to an identifier associated with an entry in a transaction log (e.g., a database of transactions between consumers and the third party).

Additionally or alternatively, the transaction may be a recurring transaction between the consumer and the third party. In an additional or alternative aspect, the third party may be a banking entity or other financial entity (e.g., credit card company), and the transaction may be associated with a deposit into an account at the banking entity from a remote location (e.g., the money transfer location), a withdrawal from the account at the banking entity from the remote location (e.g., the money transfer location), an application to open a bank account, a loan application, an application to open a credit card, or a combination thereof. In this aspect, the transaction information may include information descriptive of the account of the consumer, a document (e.g., an application, a withdrawal slip, a deposit slip, etc.), and the verification information may include a copy of the deposit or withdrawal slip and a copy of a receipt provided in connection with the withdrawal or the deposit, or may include an electronic copy of the completed application.

Thus, the system 100, and in particular the beacon device 102, may increase the reliability, safety, and convenience of many types of transactions (e.g., consumer-to-business transactions and/or consumer-to consumer transactions). Additionally, the system 100 may provide additional streams of revenue to an operator of the agent device 120 (e.g., by enabling greater numbers of payments at the agent location and/or higher frequencies of on-time payments). Moreover, the system 100 may also provide for an improvement to computer technology whereby the computer application is more reliably able to locate a host mobile device within a geographic zone. The system 100 may also provide for an improvement to computer technology whereby the computer application, in response to a beacon advertisement, causes activation of the computer application, processing of data within the beacon advertisement, and display of a bill payment/money transfer notification as a result of the received beacon advertisement.

In addition, the system 100 may provide an improvement to computer technology whereby the computer application remotely causes an agent location computing device to stage a payment in response to receipt of the abovementioned beacon advertisement. Accordingly, the system 100 improves on existing notification methods by providing a beacon-device-based transaction staging method. The subsequently staged transaction can then be tracked back to the precise beacon advertisement that prompted the notification by the computer application and consumer action. This leads to improvements to computer technology also whereby such computer applications can be better optimized to respond more quickly or more efficiently to those types of beacon advertisements that have been proven to be more effective.

Figure 2:
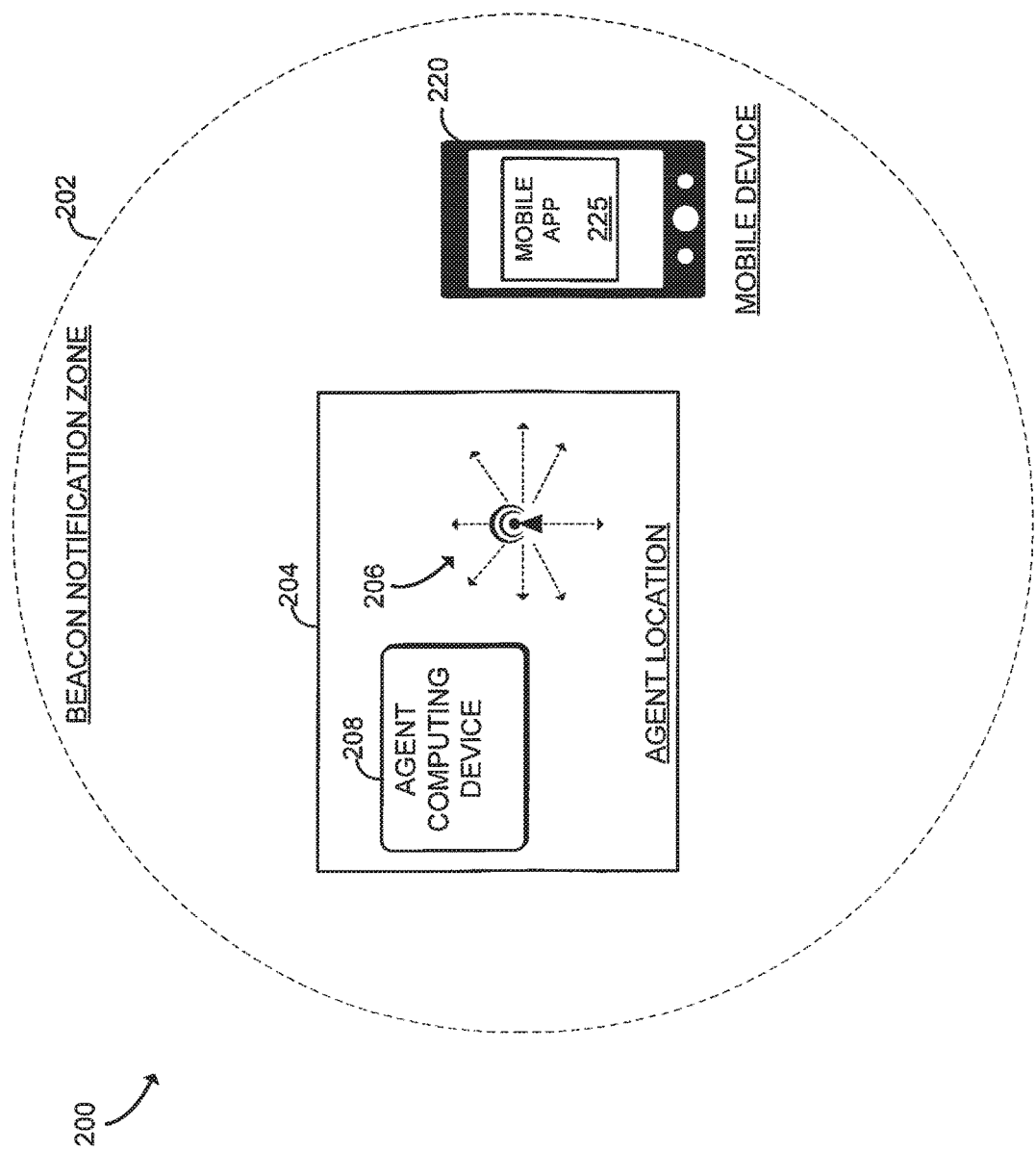
FIG. 2 illustrates a customer notification environment in which one or more techniques described herein may be implemented according to various embodiments.

FIG. 2 illustrates a customer notification environment 200. Environment 200 includes a beacon device 206 (similar to the beacon device 102 as described with respect to FIG. 1) and an agent computing device 208 (similar to the agent device 120 as described with respect to FIG. 1) located within an agent location 204. In the illustrative embodiment, agent location 204 may be associated with any bill payment and money transfer location or facility. For example, agent location 204 may be exclusively a bill payment and money transfer agent location. As another example, agent location 204 may be a different type of business (e.g., a large department store) that includes an office, desk, counter, kiosk, or electronic payment machine or device that can be used to process bill payments and money transfers. Agent location 204 may also be, for example, associated with a financial institution such that for example, the financial institution provides bill payment and money transfer functions that may be associated with a particular money transfer agent or independent.

As described above with respect to FIG. 1, in the illustrative embodiment, the beacon device 206 broadcasts beacon advertisements within a physical space at predefined intervals. As shown in FIG. 2, the beacon device 206 will transmit beacon advertisements in a physical space referred to herein as a beacon advertisement zone 202. Beacon advertisement zone 202 is, in the illustrative embodiment, a spherical space with the beacon device 206 at its center. The beacon advertisements are transmitted in all directions at a specific distance within the beacon advertisement zone 202. It is to be appreciated that agent location 204 may house multiple beacon devices 206, each with its own beacon advertisement zone 202. Beacon advertisement zone 202 may acquire any shape, size, or orientation that is within the capabilities of beacon device 202.

In the illustrative embodiment, any mobile device that enters the beacon advertisement zone 202 will receive the beacon advertisement being broadcast by the beacon device 206. As shown in FIG. 2, a mobile device 220 (similar to the mobile device 110 as described above with respect to FIG. 1) enters the beacon advertisement zone 202. For example, a consumer may be traveling (e.g., walking or driving) in the vicinity of agent location 204 in such a proximity that the consumer enters the beacon advertisement zone 202. It is to be appreciated that at least some part of the beacon advertisement zone 202 lies outside agent location 202. In other words, the consumer is not required to enter agent location 204 in order for the consumer's mobile device 220 to receive the beacon advertisement. In fact, it may not be immediately evident to the consumer himself or herself that the consumer is in the vicinity of agent location 204. For example, the consumer may be on a different street or around a corner and may not see agent location 202. The consumer may see agent location 202 but not recognize it as a bill payment and money transfer location.

Upon entering beacon advertisement zone 202, the consumer's mobile device 220 receives the beacon advertisement. In the illustrative embodiment, mobile device 220 operates a bill payment and money transfer computer application 225. The computer application 225 may be a mobile application configured to run using a mobile operating system. For example, the consumer may use the computer application 225 to pay recurring bills, to manage account information, to add/remove/change payees, to schedule payments, to receive payment notifications, or the like. In the illustrative embodiment, the computer application 225 is configured to receive the beacon device advertisement, where the beacon device advertisement includes the UUID, major identifier, and minor identifier. The computer application 225 is also configured to identify, based on the UUID, major identifier, and minor identifier, that the beacon device 206 is associated with a bill payment and money transfer location (e.g., agent location 204).

The computer application 225 is further configured to generate a payment notification for display on the mobile device. The payment notification, in the illustrative embodiment, will include payment data and the agent location data. For example, payment data will include a payment amount, payment due date/time, payee information, payment currency, other payment information such as the number of the payment (e.g., second of ten payments), whether the payment is currently due, past due, late, or the like. Agent location data will include agent location name, agent location address, agent location geographic coordinates, agent location telephone number, or the like. Agent location data may also include identifiers for the agent computing device 208, such as network addresses, computer names, or any other information required to be able to identify and communicate with the agent computing device 208.

In one embodiment, the UUID, major identifier, and minor identifier constitute the full payment data and agent location data required by the computer application 225 to generate the payment notification. For example, the UUID, major identifier, and minor identifier will include sufficient data that can be parsed and or formatted into a version that is readable by the consumer on the mobile device 220. In another embodiment, the UUID, major identifier, and minor identifier will only represent specific data that requires further search and processing by the computer application 225 in order to generate the payment notification.

Accordingly, the computer application 225 is configured to process the UUID to obtain, for example, other identifiers for the agent location 204. In one embodiment, the computer application 225 will access central server 160 via network 170 (shown in FIG. 1). The computer application 225 may access an agent location database and search the database using the UUID as a key. The computer application 225 may then retrieve certain agent location identifiers, such as the agent location geographic coordinates, or the like. Specifically, the agent location geographic coordinates may be used to generate a point on a map that will then be displayed to the consumer as part of the payment notification. The computer application 225 provides the consumer the ability to click on a map icon and see the agent location on the map. The computer application 225 will also provide driving or walking directions to the agent location using the map, so that the consumer can travel directly to the agent location to make a payment.

The computer application 225 is also configured to receive, from a consumer, an instruction to prepare to make a payment at the agent location 204. For example, the consumer may view the payment notification and decide to make a payment. Accordingly, the computer application 225 provides the consumer with a control (e.g., a button, icon, list, text box, radio button, etc.). The consumer interacts with the control to express a desire to make an in-person payment at the agent location. In one embodiment, the computer application 225 is configured to generate a map and directions even before the consumer provides the computer application 225 with an instruction to make a payment. In another embodiment, the consumer's instruction to prepare to make a payment causes the computer application 225 to generate the map and directions to enable the consumer to travel to the agent location 204.

Based on an instruction that the consumer wishes to make a payment at the agent location 204, the computer application 225 is configured to communicate with the agent location 204 and cause the agent location 204 to stage the payment. As used herein, staging the payment transaction refers to an agent location preparing to receive a payment from the consumer. Preparing to receive the payment will involve receiving the payment data as well as consumer data. Consumer data may include, for example, consumer identifiers such as the consumer's name, contact information, account information, payment history, or the like. The computer application 225 transmits payment data and consumer data to the agent location 204. Specifically, the computer application 225 communicates with the agent computing device 208 via the network 170 using, for example, an internet protocol (IP) address of the agent computing device 208. The agent computing device 208 is configured to receive payment data and consumer data and stage the payment transaction using these data. In one embodiment, the agent computing device 208 is configured to stage the payment transaction for a specified time (e.g., 30 minutes). This will allow the consumer to enter the agent location within the specified time and quickly complete the payment.

Figure 3:
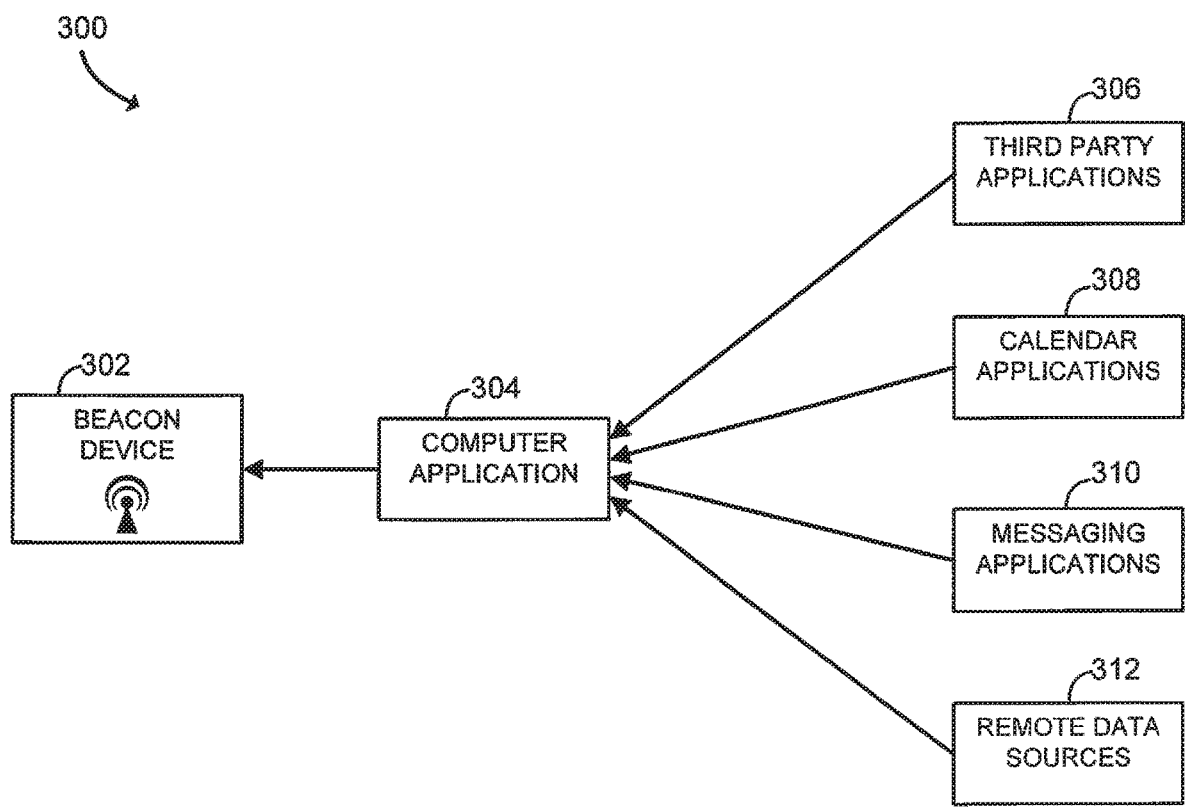
FIG. 3 illustrates a data flow environment for customer notifications using beacon devices in which one or more techniques described herein may be implemented according to various embodiments.

FIG. 3 illustrates a data flow environment 300 for customer notifications using beacon devices. As shown in FIG. 3, environment 300 includes a representation of beacon device 302 (similar to beacon device 102 shown in FIG. 1 and beacon device 206 shown in FIG. 2). Environment 300 also includes a computer application 304 (similar to computer application 225 shown in FIG. 2). In one embodiment, the computer application 304 is understood to be executing on a mobile device such as the mobile device 110 (shown in FIG. 1) or the mobile device 220 (shown in FIG. 2).

Environment 300 shows the computer application 304 receiving data from multiple sources, including third party applications 306, calendar applications 308, messaging applications 310, and remote data sources 312. In the exemplary embodiment, the computer application 304 is configured to extract data from these sources and use it to generate payment notifications any time the consumer is in, for example, the beacon advertisement zone 202 (as shown in FIG. 2). As described above, receiving a beacon advertisement from a beacon device 206 or a beacon device 302 will prompt the computer application 304 to generate a payment notification. In the illustrative embodiment, the computer application 304 generates the payment notification using payment data associated not just with the computer application 304 but also payment data that is retrieved from, for example, third party applications 306, calendar applications 308, messaging applications 310, and remote data sources 312.

In some embodiments, the computer application 304 is configured to extract data from the abovementioned sources. For example, the computer application 304 is configured to inventory the mobile device 110 and determine third-party applications 306 that may store or execute data that relates to the consumer's payments. For example, third-party applications 306 may include a utility company's mobile application. The utility company's mobile application may locally store data regarding the consumer's utility bill payments. Accordingly, the computer application 304 is configured to communicate with the third-party application 306 and request consumer payment data (e.g., regarding utility bills). For example, the third-party application 306 will expose certain data using an application programming interface (API) such that the data can be consumed by the computer application 304.

The computer application 304 is configured to consume this payment data, convert it into a format usable by the computer application 304, and incorporate it into the generated payment notification. For example, the payment data received from the third-party application 306 may indicate a payment due date of the fifteenth of every month. The payment data may also include the currently due utility bill amount (or a regularly scheduled amount, such as in the case of cellular service bill). Accordingly, receiving a beacon advertisement will cause the computer application 304 to search through the received payment data from the third-party application 306 and determine whether a payment is due. If so, the computer application 304 generates a payment notification with respect to the third-party payment data (e.g., "pay utility bill of $50.00 by October 15. You are near Agent Location. Want to make a payment there?").

The computer application 304 is also configured to receive payment data from one or more calendar applications 308 executing on the mobile device 220. In one embodiment, the consumer uses a calendar application 308 to store reminders, alerts, and/or notifications regarding important events, such as payments. These alerts may be one-time alerts or recurring alerts. The alert may include certain text, such as a dollar amount, or words such as "pay", "bill", "<utility company name>", "tuition", "loan", "money transfer", "send money to India", or the like. The computer application 304 is configured to search this text or other data available from the calendar application 306 to generate a payment notification. For example, if there is an alert in the consumer's calendar application reminding the consumer to make a bill payment on a certain date, and the computer application 304 receives a beacon advertisement, the computer application 304 will generate a payment notification prompting the consumer to make the bill payment at the agent location where the beacon advertisement originated.

The computer application 304 is also configured to receive payment data from one or more messaging applications 310 executing on the mobile device 220. Messaging applications 310 may include applications to send and receive email messages, text messages, short message service (SMS) messages, chat messages, pings, animated messages, audio or video messages, or the like. In one embodiment, the consumer uses a messaging application 308 to send or receive a message that has content relevant to a payment. For example, the consumer may send an email message to another person that includes the text "I'll pay you $50 by Tuesday". Or the consumer may receive, for example, utility bill payment notifications by email. The email or other message may include certain text as described above. The computer application 304 is configured to search this text or other data available from the messaging application 308 to generate a payment notification. Once the computer application 304 receives a beacon advertisement, the computer application 304 will generate a payment notification prompting the consumer to make the bill payment at the agent location where the beacon advertisement originated.

The computer application 304 is also configured to receive payment data from remote data sources 312. As used herein, remote data sources 304 may include, for example, central server 160, which may be associated with a bill payment and money transfer institution. The bill payment and money transfer institution may be the creator of the computer application 304. The computer application 304 is configured to receive data feeds from one or more remote data source 304 that the computer application 304 then processes to generate payment notifications. As another example, the computer application 304 may be configured to receive bill payment information directly from a utility company.

Figure 4:
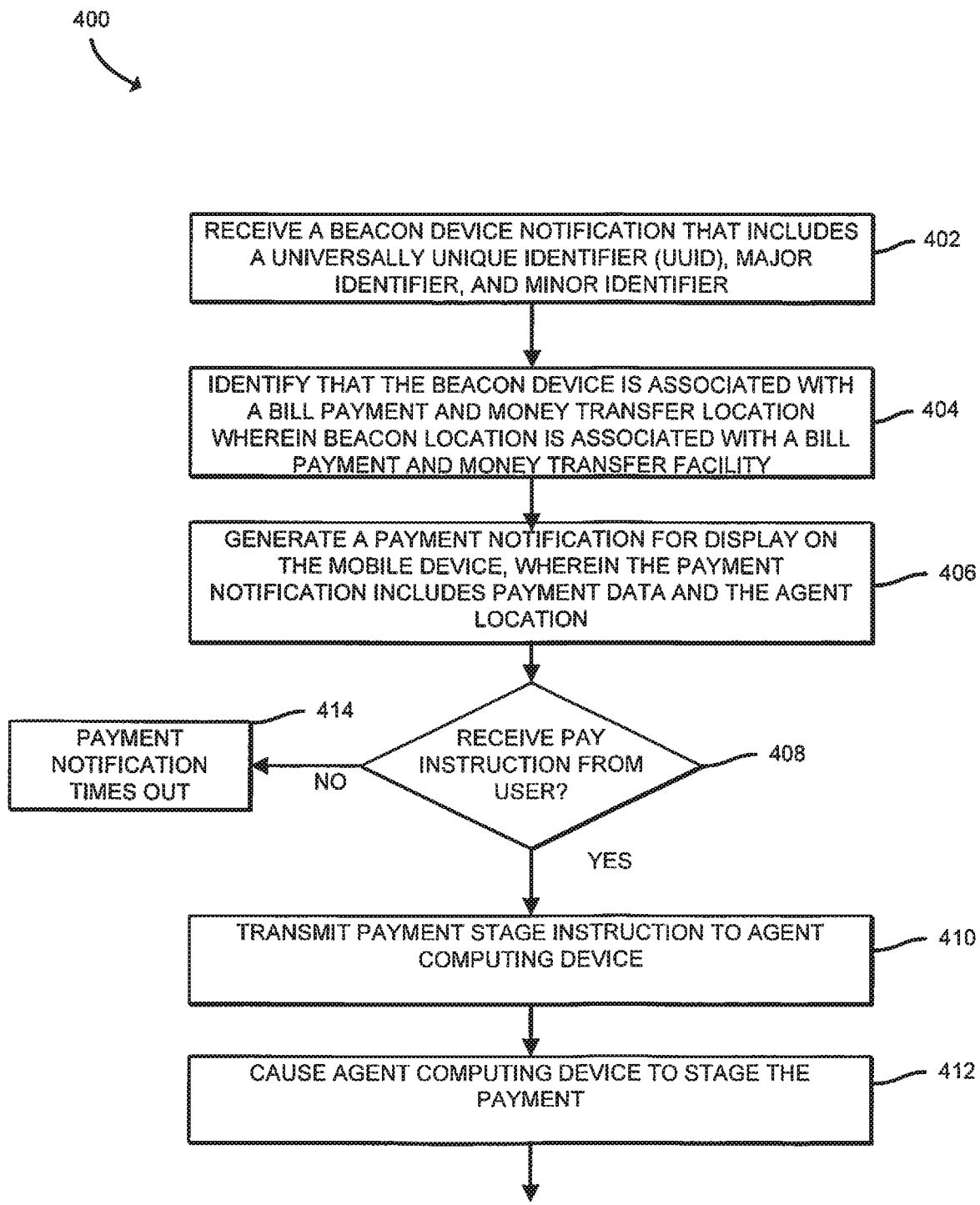
FIG. 4 illustrates a method flow 400 by which the computer application 304 (similar to the computer application 225 shown in FIG. 2) receives and processes beacon advertisements to generate payment notifications for a consumer.

FIG. 4 illustrates a method flow 400 by which the computer application 304 (similar to the computer application 225 shown in FIG. 2) receives and processes beacon advertisements to generate payment notifications for a consumer. The method begins at block 402, in which the computer application 304 receives, from a beacon device, by a processor, a beacon device advertisement. In one embodiment, the beacon device advertisement includes a universally unique identifier (UUID), major identifier, and minor identifier. As described above with respect to FIG. 2, the computer application 304 receives the beacon device advertisement when the consumer's mobile device 110 is in the beacon advertisement zone 202. The method advances to block 404, in which the computer application 304 identifies, based on the UUID, major identifier, and minor identifier, that the beacon device that transmitted the advertisement is associated with a bill payment and money transfer location. For example, the computer application 304 will determine that the beacon advertisement originated from a beacon device 206 associated with the agent location 204.

The method advances to block 406, in which the computer application 304 generates a payment notification for display on the mobile device. The payment notification will include payment data and the agent location data. In one embodiment, the payment notification is displayed within an interface of the computer application 304. The application display will show the payment amount, the payment due date, the account(s) available to make the payment, or the like. The application display will also display a button or control prompting the consumer to instruct that the consumer wishes to make a payment. The application display will also display one or more controls enabling the consumer to customize or turn off payment notifications.

The application display will also display a map icon or other map control. Interacting with the map control causes the computer application 304 to switch to a mapping application on the mobile device 110. The computer application 304 provides the mapping application with the agent location 204's geographic coordinates. The mapping application will display a dropped pin corresponding to the agent location's geographic coordinates. The mapping application will also display driving and/or walking directions to the agent location, based on GPS.

The method advances to block 408, in which the computer application 304 determines whether it has received, from the consumer, an instruction to prepare to make a payment at the agent location. For example, the computer application 304 receives an electronic signal that the consumer has pressed or otherwise interacted with a control on the application display of the computer application 304 indicating that the consumer wishes to make a payment at the agent location 204. The method advances to block 410, in which the computer application 304 transmits a payment stage instruction to agent computing device 208 (as shown in FIG. 2). As described above, the payment stage instruction provides the agent computing device 208 with sufficient data to enable the agent computing device 208 to prepare to receive a payment from the consumer. For example, the computer application 304 will formulate a payment stage instruction that includes the payment amount, payment date, payment time, or the like. The payment stage instruction will also include consumer data such as consumer identifiers (consumer name, phone, address) and consumer account identifiers. The payment stage instruction may also include supplemental data informing the agent computing device 208 of the consumer's location, the consumer's decision to make the payment in response to a specific beacon advertisement, past payments of the consumer at the agent location 204, or the like. The method advances to block 412, in which the computer application 304 causes the agent location 204 to stage the payment as described with respect to block 410.

Referring back to block 408, the computer application 304 may receive an instruction from the consumer that the consumer does not wish to make a payment at this time. Or the computer application 304 may receive no instruction at all. In such a case, the method advances to block 414, in which the computer application 304 allows the payment notification to time out. For example, the payment notification may disappear from the computer application 304 after a certain period of time. As another example, the payment notification may continue to display and alert the consumer as long as the consumer's mobile device 110 is in the beacon advertisement zone 202.

Figure 5:
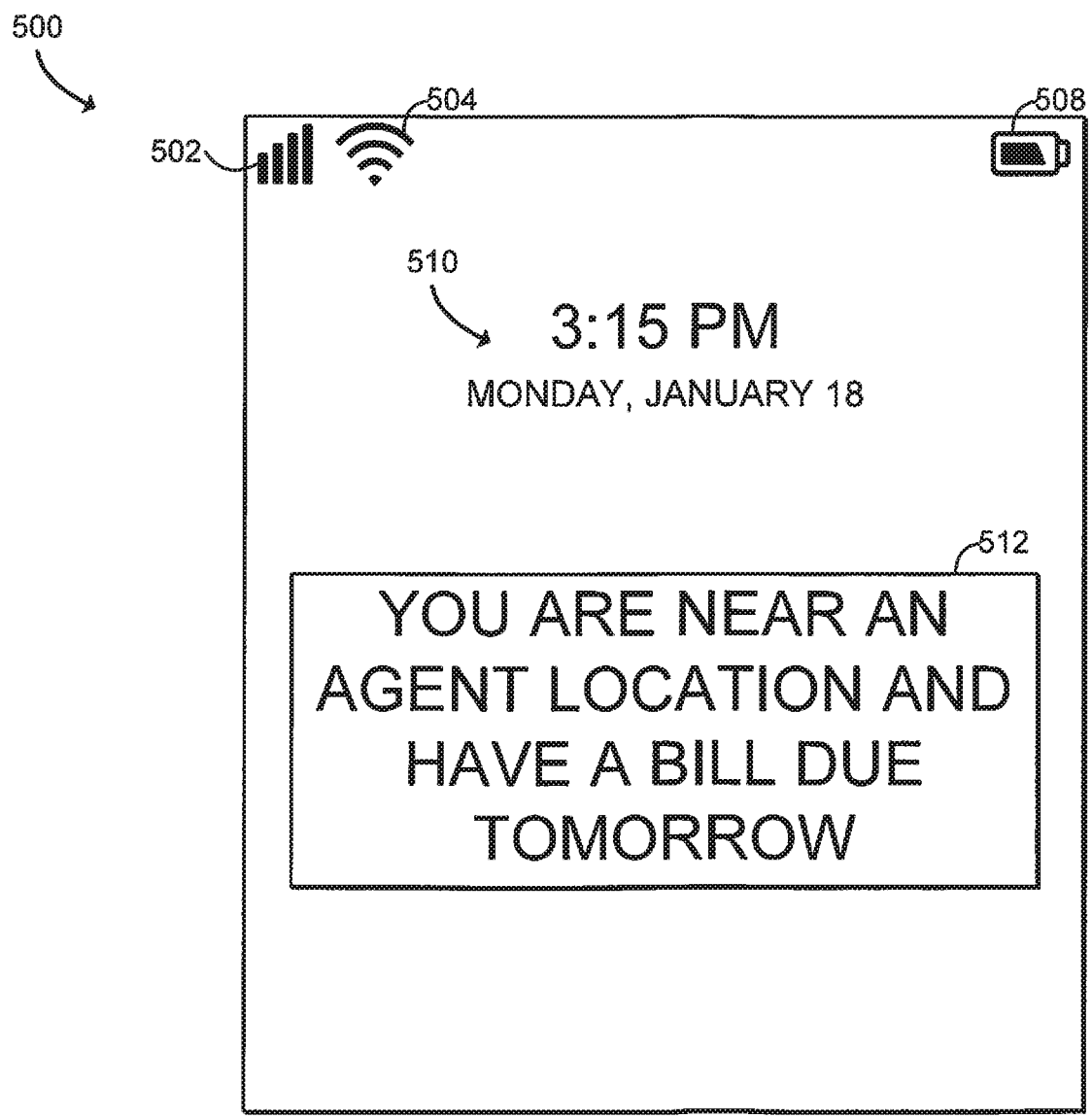
FIG. 5 illustrates a computing device display that features a notification that is generated as a result of a beacon device advertisement.

FIG. 5 illustrates a computing device display 500 that features a notification that is generated as a result of a beacon device advertisement. In the exemplary embodiment, display 500 is associated with a mobile computing device such as the mobile device 110, shown in FIG. 1). However, it should be appreciated that the display 500 could be embodied on any computing device that includes the capability to control a graphical display to display a notification as shown in FIG. 5. As shown in FIG. 5, display 500 includes a cellular signal strength icon 502, a wireless signal strength icon 504, and a battery life icon 508. Display 500 also includes a date and time display 510. Display 500 also includes a payment notification message 512. In the exemplary embodiment, payment notification message 512 displays on a "home" screen or "lock" screen of the mobile device 110. In other words, the payment notification message 512 displays on the display screen of the mobile device 110 without the consumer having to unlock or otherwise activate the mobile device 110. In addition, payment notification message 512 may be displayed along with an audio notification, such as a bell, ding, or other alert sound.

In the exemplary embodiment, payment notification message 512 is displayed on mobile device 110 as a result of a beacon advertisement. For example, a consumer will have the mobile device 110 activated (e.g., turned on). The consumer will also have the computer application 225 running on the mobile device 110. The consumer will bring the mobile device 110 into the beacon notification zone 202. The computer application 225 is configured to detect that the mobile device 110 is within the beacon notification zone 225, based on a beacon advertisement received from the beacon device 206. The computer application 225 is further configured to use the beacon advertisement to generate a notification and display it as the payment notification message 512.

In the exemplary embodiment, the computer application 225 receives the beacon advertisement and reviews the payment data received from, for example, third party applications 306, calendar applications 308, messaging applications 310, and remote data sources 312. More specifically, the computer application 225 is configured to search through the received payment data and determine whether the consumer has a payment due soon. The computer application 225 is configured to identify upcoming payments based on configuration settings provided by the consumer. For example, the consumer will configure the computer application 225 to provide the payment notification message 512 only for payments that are due within the next three days. Accordingly, the computer application 225 identifies a payment as an upcoming payment that requires a payment notification message 512 only if the payment date falls within the next three days. Under the consumer's specified configuration, the computer application 225 is configured to then ignore other payments that fall outside the three-day window, regardless of any received beacon advertisements.

Based on the received beacon advertisement, payment data, and consumer configuration, the computer application 225 displays payment notification message 512. As shown in FIG. 5, the payment notification message 512 shows the following text: "YOU ARE NEAR AN AGENT LOCA- TION AND HAVE A BILL DUE TOMORROW." In the exemplary embodiment, the notification text is configurable and can be more specific or tailored to provide specific information. For example, the payment notification message 512 may state the amount of the payment, the payment date, the payment account, the payee, and/or any other payment data that is configured to be included in the notification by the consumer.

Figure 6:
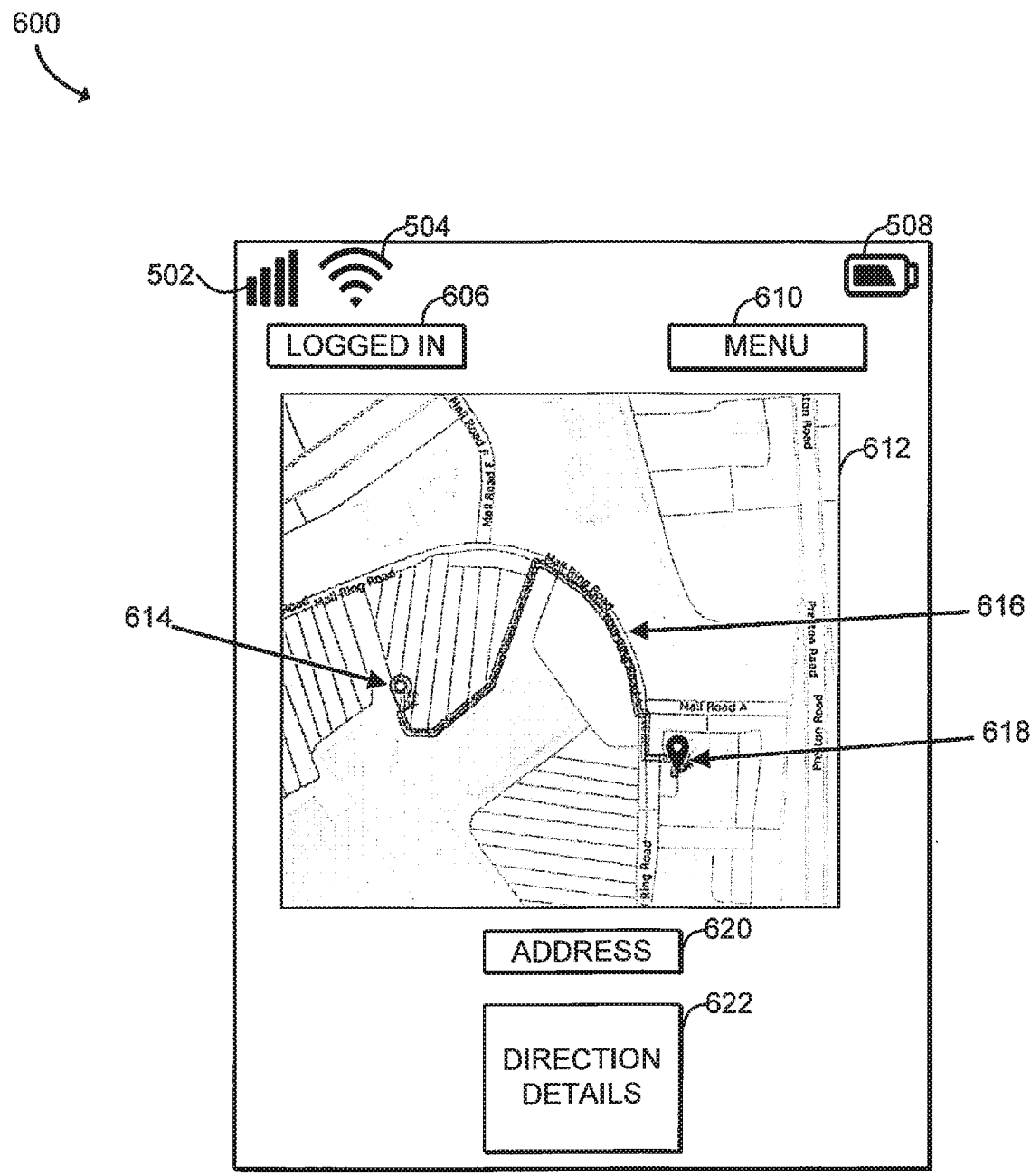
FIG. 6 illustrates a computing device display that shows a screen from within a computer application showing a map view resulting from a beacon advertisement.

FIG. 6 illustrates a computing device display 600 that shows a screen from within a computer application (e.g., the computer application 225) operating on a computing device (e.g., the mobile device 110). More specifically, display 600 represents a map screen. In the exemplary embodiment, the map screen will be displayed once a consumer receives a payment notification message (e.g., payment notification message 512), elects to make a payment at the agent location that sent the beacon advertisement, and requests directions to the agent location from the computer application 225. In one embodiment, the computer application 225 is configured to display a map screen within an interface or view of the computer application 225. In another embodiment, the computer application 225 is configured to cause the mobile device 110 to activate a separate mapping application. As shown in FIG. 5, display 600 includes a cellular signal strength icon 502, a wireless signal strength icon 504, and a battery life icon 508. Display 600 also includes an application status indicator 606, an application menu control 610, a map view 612, an address listing 620, and a direction details listing 622. Within the map view 612 is shown a consumer location pin 614, a directions line 616, and an agent location pin 618.

In the exemplary embodiment, the consumer receives the payment notification message 512 (as shown in FIG. 5) and decides to make a payment at the agent location. For example, the consumer will interact with the payment notification message 512 (e.g., by touching and sliding across the display screen of the mobile device 110. The computer application 225 is configured to detect the interaction with the payment notification message 512 and activate a display of the computer application 225. In the exemplary embodiment, the computer application 225 displays display 600.

As shown in display 600, the map view 612 displays directions from the consumer's location to the agent location. The computer application 225 is configured to use mapping technology such as Global Positioning System (GPS) technology to determine the consumer's location and the agent location. For example, the computer application 225 will use location data from the mobile device 110 as the consumer's location and assign that to the consumer location pin 614. The computer application 225 will also determine the agent location using, for example, GPS.

In one embodiment, the computer application 225 determines the agent location using the beacon advertisement. For example, the computer application 225 will receive one or more agent location identifiers (e.g., the agent location street address) using the UUID, major identifier, and minor identifier and determine the agent location. As another example, the computer application 225 receives an agent identifier (e.g., a store identifier) and uses the agent identifier to look up the agent location address in a database (e.g., a database located at the central server 160). As yet another example, the computer application 225 will determine the agent location by providing the UUID, the major identifier, and/or the minor identifier to the central server 160 and request one or more agent location identifiers. For example, the computer application 225 may request the agent location address in terms of a street identifier, a city identifier, a state identifier, and/or a zip code identifier. As another example, the computer application 225 may request the agent location in terms of geographic coordinates (e.g., a latitude value and a longitude value).

In another embodiment, the computer application 225 determines the agent location using a local database stored at the mobile device 110. For example, the computer application 225 may store an agent location listing for all agent locations associated with a particular agent. Accordingly, when the beacon advertisement is received, the computer application 225 searches through the local database using the UUID, major identifier, and/or minor identifier to determine the agent location. Once the agent location is determined, the computer application 225 is configured to associate the agent location with the agent location pin 618 and display it on the map view 612. In addition, the computer application 225 is also configured to generate a route or directions from the consumer location pin 614 to the agent location pin 618. For example, the computer application 225 generates directions line 616 showing the consumer exactly how to navigate to the agent location.

Additionally, the computer application 225 is also configured to provide the agent location using the address listing 620. For example, the address listing 620 will show the agent location address using text that the consumer can copy into, for example, a separate mapping application. The computer application 225 is also configured to provide directions corresponding to the directions line 616 using the direction details listing 622. Interacting with direction details listing 622 will show step-by-step or turn-by-turn directions to navigate to the agent location.

In another embodiment, the computer application 225 redirects the mobile device 110 to a separate mapping application that shows a map view similar to map view 612. In this embodiment, the computer application 225 is configured to transmit the determined consumer location and agent location to the mapping application. The mapping application then displays these using icons or controls similar to the consumer location pin 614, the agent location pin 618, and the directions line 616, to enable the consumer to navigate to the agent location.

Figure 7:
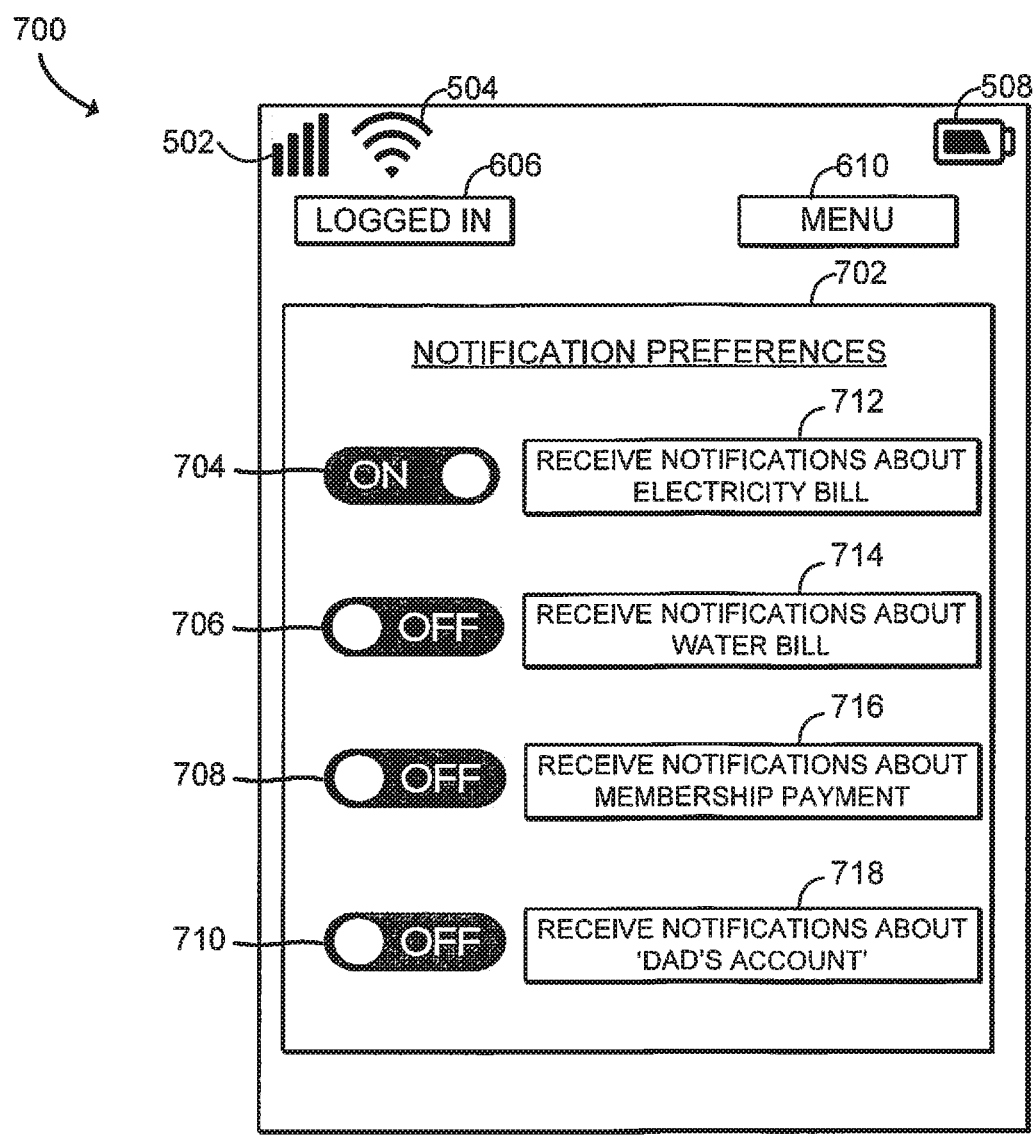
FIG. 7 illustrates a configuration screen of the computer application that enables the consumer to configure notifications that are generated as a result of beacon advertisements.

FIG. 7 illustrates a configuration screen 700 of the computer application 225 that enables the consumer to configure notifications (e.g., the payment notification message 512) that are generated as a result of beacon advertisements. As shown in FIG. 7, screen 700 includes a cellular signal strength icon 502, a wireless signal strength icon 504, and a battery life icon 508. Screen 700 also includes an application status indicator 606 and an application menu control 610. More specifically, one or more options (not shown) within the application menu control 610 will enable a consumer to view screen 700.

Screen 700 also includes configuration controls 704, 706, 708, and 710. Screen 700 also includes configuration labels 712, 714, 716, and 718. In the exemplary embodiment, when screen 700 is active, the consumer is able to configure notifications using one of configuration controls 704, 706, 708, and 710. For example, FIG. 7 shows that configuration control 704 is in the "ON" position. Configuration control 704 corresponds to configuration label 712, which includes text stating "RECEIVE NOTIFICATIONS ABOUT ELECTRICITY BILL". This indicates that the consumer has elected to receive notifications regarding the consumer's electricity bill. As a result, when the consumer brings mobile device 110 into a beacon notification zone 202 and the consumer's electricity bill is due within a certain period of time, the consumer will receive a payment notification message 512 such as "YOU ARE NEAR AN AGENT LOCATION AND HAVE AN ELECTRICITY BILL DUE TOMORROW".

FIG. 7 shows that configuration control 706 is in the "OFF" position. Configuration control 706 corresponds to configuration label 714, which includes text stating "RECEIVE NOTIFICATIONS ABOUT WATER BILL". This indicates that the consumer has elected not to receive notifications regarding the consumer's water bill.

FIG. 7 shows that configuration control 708 is in the "OFF" position. Configuration control 708 corresponds to configuration label 716, which includes text stating "RECEIVE NOTIFICATIONS ABOUT MEMBERSHIP PAYMENT". This indicates that the consumer has elected not to receive notifications regarding the consumer's membership payment. For example, the consumer may have a gym membership that the consumer always remembers to pay for and does not require notifications.

FIG. 7 shows that configuration control 710 is in the "OFF" position. Configuration control 710 corresponds to configuration label 718, which includes text stating "RECEIVE NOTIFICATIONS ABOUT 'DAD'S ACCOUNT'". This indicates that the consumer has elected not to receive notifications regarding a particular account. In the exemplary embodiment, the computer application 225 is configured to enable the consumer to customize the text of one or more configuration labels 712, 714, 716, and 718. As shown with respect to configuration label 718, the computer application 225 provides the ability for the consumer to type in or edit the text 'DAD'S ACCOUNT'. In a related embodiment, the computer application 225 is configured to parse or interpret text from payment data received from another application (e.g., calendar application 308) in order to generate a relevant configuration label. For example, a calendar application 308 will include a calendar entry labeled "PAY DAD'S CELL PHONE BILL". Receiving this as part of the payment data from the calendar application 308 prompts the computer application 225 to generate a configuration label stating, for example "RECEIVE NOTIFICATIONS ABOUT DAD'S CELL PHONE BILL". This enables the consumer to more specifically identify certain payments and facilitates the consumer's remembrance of payments to ensure timely and accurate payments.

Unless defined otherwise, all technical and scientific terms used herein have the same meanings as commonly understood by one of ordinary skill in the art to which the embodiments described herein belong. All publications and patents specifically mentioned herein are incorporated by reference in their entirety for all purposes including describing and disclosing the instruments, statistical analyses and methodologies which are reported in the publications which might be used in connection with the embodiments described herein. All references cited in this specification are to be taken as indicative of the level of skill in the art. Nothing herein is to be construed as an admission that the embodiments described herein are not entitled to antedate such disclosure by virtue of prior invention.

The following paragraphs enumerated consecutively from 1 through 20 provide for various aspects of the present embodiments described herein. In one embodiment, in a first paragraph (1), the present embodiments described herein provide:

1. A method for beacon device-based customer notifications, the method implemented by a computing device comprising a processor, the method comprising:

receiving from a beacon device, by the processor, a beacon device advertisement, wherein the beacon device advertisement includes a universally unique identifier (UUID), a major identifier, and a minor identifier;

identifying, based on at least one of the UUID, the major identifier, and the minor identifier, that the beacon device is associated with an agent location, wherein the agent location is corresponds to a bill payment and money transfer facility;

generating a payment notification for display on the computing device, wherein the payment notification includes payment data and agent location data;

receiving, from a user, an instruction to prepare to make a payment at the agent location; and causing the agent location to stage the payment for completion by the user.

2. The method of paragraph 1, further comprising receiving the payment data from a data store associated with the computing device.

3. The method of paragraph 1 or 2, further comprising customizing one or more features of the payment notification, wherein customizing the one or more features includes at least one of: adjusting a schedule of the payment notification and deactivating the payment notification.

4. The method of any of paragraphs 1 through 3, further comprising:

accessing data from a third-party application installed on the computing device;

identifying payment data stored in association with the third-party application;

storing payment data in a database; and generating the payment notification in response to the beacon device advertisement, wherein the payment notification includes payment data accessed from the third-party application.

5. The method of paragraph 4, wherein the third-party application is a messaging application installed on the computing device, and wherein the messaging application includes at least one of an email application and a text messaging application.

6. The method of paragraph 1, wherein the beacon advertisement is transmitted within a predefined geofence, and wherein the computing device receives the beacon advertisement when the computing device enters the geofence.

7. The method of any of paragraphs 1 through 6, further comprising:

displaying a map control with the payment notification;

receiving an interaction with the map control from the user; and displaying a map that includes directions to the agent location in association with the payment notification.

8. The method of any of paragraphs 1 through 7, further comprising:

receiving a decline instruction from the user; and declining to cause the agent location to stage the payment for completion by the user.

9. A system comprising:

a processor; and a memory coupled to the processor, the memory storing instructions that, when executed by the processor, cause the processor to perform operations including:

receiving from a beacon device, by the processor, a beacon device advertisement, wherein the beacon device advertisement includes a universally unique identifier (UUID), a major identifier, and a minor identifier;

identifying, based on at least one of the UUID, the major identifier, and the minor identifier, that the beacon device is associated with an agent location, wherein the agent location is corresponds to a bill payment and money transfer facility;

generating a payment notification for display on the computing device, wherein the payment notification includes payment data and agent location data;

receiving, from a user, an instruction to prepare to make a payment at the agent location; and causing the agent location to stage the payment for completion by the user.

10. The system of paragraph 9, wherein the operations include receiving the payment data from a data store associated with the computing device.

11. The system of paragraph 9, wherein the operations include customizing one or more features of the payment notification, wherein customizing the one or more features includes at least one of: adjusting a schedule of the payment notification and deactivating the payment notification.

12. The system of paragraph 9, wherein the operations include:

accessing data from a third-party application installed on the computing device;

identifying payment data stored in association with the third-party application;

storing payment data in a database; and generating the payment notification in response to the beacon device advertisement, wherein the payment notification includes payment data accessed from the third-party application.

13. The system of paragraph 12, wherein the third-party application is a messaging application installed on the computing device, and wherein the messaging application includes at least one of an email application and a text messaging application.

14. The system of paragraph 1, wherein the operations include:

displaying a map control with the payment notification;

receiving an interaction with the map control from the user; and displaying a map that includes directions to the agent location in association with the payment notification.

15. A computer-readable storage device storing instructions that, when executed by a processor, cause the processor to perform operations including:

receiving from a beacon device, by the processor, a beacon device advertisement, wherein the beacon device advertisement includes a universally unique identifier (UUID), a major identifier, and a minor identifier;

identifying, based on at least one of the UUID, the major identifier, and the minor identifier, that the beacon device is associated with an agent location, wherein the agent location is corresponds to a bill payment and money transfer facility;

generating a payment notification for display on the computing device, wherein the payment notification includes payment data and agent location data;

receiving, from a user, an instruction to prepare to make a payment at the agent location; and causing the agent location to stage the payment for completion by the user.

16. The computer-readable storage device of paragraph 15, wherein the operations include receiving the payment data from a data store associated with the computing device.

17. The computer-readable storage device of paragraph 15, wherein the operations include customizing one or more features of the payment notification, wherein customizing the one or more features includes at least one of: adjusting a schedule of the payment notification and deactivating the payment notification.

18. The computer-readable storage device of paragraph 15, wherein the operations include:

accessing data from a third-party application installed on the computing device;

identifying payment data stored in association with the third-party application;

storing payment data in a database; and generating the payment notification in response to the beacon device advertisement, wherein the payment notification includes payment data accessed from the third-party application.

19. The computer-readable storage device of paragraph 15, wherein the beacon advertisement is transmitted within a predefined geofence, and wherein the computing device receives the beacon advertisement when the computing device enters the geofence.

20. The computer-readable storage device of paragraph 15, wherein the operations include:

displaying a map control with the payment notification;

receiving an interaction with the map control from the user; and displaying a map that includes directions to the agent location in association with the payment notification.

Although aspects of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, means, methods, or steps.

The invention claimed is:

1. A method for communication between a remote beacon device and a mobile computing device comprising a processor, the method comprising:

entering a predefined geofence, receiving from a remote beacon device at a predefined interval, by the processor, a beacon device advertisement broadcast within the pre-defined geofence, wherein the beacon device advertisement includes a universally unique identifier (UUID), a major identifier, and a minor identifier;

identifying, by the processor, the beacon device using the UUID, wherein the beacon device is associated with an agent location of a bill payment and money transfer facility;

identifying and distinguishing a particular type of agent locations, by the processor using the major identifier;

identifying a specific geographic location to a granular level of the beacon device by the processor using the minor identifier;

generating a payment notification, responsive to and based on the identification, for display on the mobile computing device, including executing the processor to retrieve payment data from at least one application on the mobile computer device and presenting the payment notification for display on a display screen of the mobile computing device, wherein the payment notification includes payment data and a map that includes directions to the agent location in association with the payment notification;

receiving, at the mobile device, an input indicating an instruction to prepare to make a payment at the agent location; and responsive to receiving the input, sending a communication signal from the mobile computing device for the agent location to stage the payment for completion by the user at a later time.

2. The method of claim 1, further comprising receiving payment data from a data storage device associated with the mobile computing device.

3. The method of claim 1, further comprising customizing one or more features of the payment notification, wherein customizing the one or more features includes at least one of: adjusting a schedule of the payment notification and deactivating the payment notification.

4. The method of claim 1, wherein executing the processor to retrieve payment data from the at least one application includes accessing data from a third-party application installed on the mobile computing device; and generating a payment notification includes:

identifying payment data stored in association with the third-party application;

storing payment data in a database; and generating the payment notification in response to the beacon device advertisement, wherein the payment notification includes payment data accessed from the third-party application.

5. The method of claim 4, wherein the third-party application is a messaging application installed on the mobile computing device, and wherein the messaging application includes at least one of an email application and a text messaging application.

6. The method of claim 1, wherein the beacon advertisement is transmitted within the predefined geofence, and wherein the computing device receives the beacon advertisement responsive to the mobile computing device entering the geofence.

7. The method of claim 1, further comprising:

displaying a map control with the payment notification; and presenting an interaction device for receiving user input for the map control.

8. The method of claim 1, further comprising:

receiving a decline instruction from the user; and declining to cause the agent location to stage the payment for completion by the user.

9. A mobile system comprising:

a mobile computing device comprising a processor; and a memory coupled to the processor, the memory storing instructions that, when executed by the processor, cause the processor to perform operations including:

receiving from a remote beacon device, by the processor, a beacon device advertisement broadcast within a predefined geofence, wherein the beacon device advertisement includes a universally unique identifier (UUID), a major identifier, and a minor identifier;

identifying, by the processor, based on the UUID, that the beacon device is associated with an agent location, wherein the agent location corresponds to a bill payment and money transfer facility;

identifying and distinguishing a particular type of agent location, by the processor using the major identifier;

identifying a specific geographic location to a granular level of the beacon device by the processor using the minor identifier;

generating a payment notification, responsive to and based on the identification, for display on the mobile computing device, including executing the processor to retrieve payment data from at least one application on the mobile computing device and presenting the payment notification for display on a display screen of the mobile computing device, wherein the payment notification includes payment data and a map that includes directions to the agent location in association with the payment notification;

receiving user activation to prepare to make payment at the agent location; and responsive to user activation of the user input device, transmitting, by the processor, a communication signal for the agent location to stage the payment for completion by the user at a later time.

10. The mobile system of claim 9, wherein the operations include receiving the payment data from a data storage device associated with the mobile computing device.

11. The mobile system of claim 9, wherein the operations include customizing one or more features of the payment notification, wherein customizing the one or more features includes at least one of: adjusting a schedule of the payment notification and deactivating the payment notification.

12. The mobile system of claim 9, wherein the at least one application includes a third-party application; and generating a payment notification includes:

storing payment data in a database; and generating the payment notification in response to the beacon device advertisement, wherein the payment notification includes payment data accessed from the third-party application.

13. The mobile system of claim 12, wherein the third-party application is a messaging application installed on the mobile computing device, and wherein the messaging application includes at least one of an email application and a text messaging application.

14. The mobile system of claim 9, wherein the operations include:

displaying a map control with the payment notification;

receiving an interaction with the map control from the user; and displaying a map that includes directions to the agent location in association with the payment notification.

15. A method of communication between a remote beacon device and a mobile computing device comprising a processor, the method comprising:

receiving from the remote beacon device at a predefined interval, by the processor, a beacon device signal, wherein the beacon device signal includes a universally unique identifier (UUID), a major identifier, and a minor identifier;

identifying the remote beacon device using the UUID;

identifying a specific geographic agent location using the minor identifier wherein the specific geographic agent location corresponds to a bill payment and money transfer facility;

identifying a flag to denote the functionality at the specific geographic agent location using the major identifier;

extracting payment data from one or more data sources;

generating a notification on the mobile device based on the extracted data; wherein the payment notification includes certain payment data and a map that includes directions to the agent location in association with the payment notification;

receiving an input indicating instruction to prepare to make a payment at the agent location; and responsive to receiving the input, sending a communication signal from the processor to the agent location to cause the agent location to stage the payment.

16. The method of claim 15, wherein the identifying a flag to denote the functionality at the specific geographic agent location further comprises whether the agent location accepts certain forms of payments.

17. The method of claim 15, wherein extracting payment data from one or more data sources includes receiving payment data from one or more messaging applications executing on the mobile device.

18. The method of claim 15, wherein extracting payment data from one or more data sources includes receiving payment data from one or more calendar applications executing on the mobile device.

19. The method of claim 15, wherein extracting payment data from one or more data sources includes receiving payment data from a remote central server associated with a bill payment and money transfer institution.

\* \* \* \* \*